(12) United States Patent
Senda et al.

(10) Patent No.: US 10,913,843 B2
(45) Date of Patent: Feb. 9, 2021

(54) RESIN COMPOSITION, PELLET, VEIL, DAMPING MATERIAL, SOUND INSULATION MATERIAL, AND INTERMEDIATE FILM FOR LAMINATED GLASS

(71) Applicant: KURARAY CO., LTD., Kurashiki (JP)

(72) Inventors: Yasushi Senda, Kamisu (JP); Shinya Oshita, Kamisu (JP); Yoshiaki Asanuma, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 77 days.

(21) Appl. No.: 16/336,369

(22) PCT Filed: Sep. 26, 2017

(86) PCT No.: PCT/JP2017/034765
§ 371 (c)(1),
(2) Date: Mar. 25, 2019

(87) PCT Pub. No.: WO2018/062192
PCT Pub. Date: Apr. 5, 2018

(65) Prior Publication Data
US 2020/0024441 A1 Jan. 23, 2020

(30) Foreign Application Priority Data

Sep. 27, 2016 (JP) .................................. 2016-188170
May 29, 2017 (JP) .................................. 2017-105674

(51) Int. Cl.
| C08L 53/02 | (2006.01) |
| B32B 17/10 | (2006.01) |
| C08F 297/04 | (2006.01) |
| G10K 11/162 | (2006.01) |

(52) U.S. Cl.
CPC ........ *C08L 53/025* (2013.01); *B32B 17/1055* (2013.01); *C08F 297/046* (2013.01); *G10K 11/162* (2013.01); *B32B 2307/102* (2013.01); *B32B 2307/56* (2013.01); *B32B 2325/00* (2013.01)

(58) Field of Classification Search
CPC .................................. C08L 53/02; B32B 17/10
USPC ............................................. 524/270
See application file for complete search history.

(56) References Cited

U.S. PATENT DOCUMENTS

| 4,514,554 A | 4/1985 | Hughes et al. |
| 4,714,749 A | 12/1987 | Hughes et al. |
| 5,292,819 A | 3/1994 | Diehl et al. |
| 5,378,536 A | 1/1995 | Miller et al. |
| 5,389,438 A | 2/1995 | Miller et al. |
| 5,399,627 A | 3/1995 | Diehl et al. |
| 2001/0039310 A1 | 11/2001 | Nomura et al. |
| 2003/0158336 A1 | 8/2003 | Yaguchi et al. |
| 2010/0239802 A1* | 9/2010 | Kuwahara ............... C08L 23/14 428/36.9 |
| 2011/0319549 A1 | 12/2011 | Oda et al. |
| 2014/0377533 A1 | 12/2014 | Waid et al. |
| 2014/0377535 A1 | 12/2014 | Waid et al. |

FOREIGN PATENT DOCUMENTS

| JP | 60-15477 A | 1/1985 | |
| JP | 61-502131 A | 9/1986 | |
| JP | 2-135256 A | 5/1990 | |
| JP | 4-351685 A | 12/1992 | |
| JP | 5-222348 A | 8/1993 | |
| JP | 6-293853 A | 10/1994 | |
| JP | 9-511260 A | 11/1997 | |
| JP | 11-263896 A | 9/1999 | |
| JP | 2001-288329 A | 10/2001 | |
| JP | 2002-528593 A | 9/2002 | |
| JP | 2006-335997 A | 12/2006 | |
| JP | 2010-512426 A | 4/2010 | |
| JP | 2010-275457 A | 12/2010 | |
| WO | WO 01/74964 A1 | 10/2001 | |
| WO | WO-2007078825 A2 * | 7/2007 | ........... A61K 8/8111 |
| WO | WO 2010/113883 A1 | 10/2010 | |
| WO | WO 2016/104740 A1 | 6/2016 | |

OTHER PUBLICATIONS

International Search Report dated Dec. 12, 2017 in PCT/JP2017/034765 filed on Sep. 26, 2017.
Extended European Search Report dated May 11, 2020, in corresponding European Patent Application No. 17856142.9 (references AA is cited therein).

* cited by examiner

*Primary Examiner* — Deve V Hall
(74) *Attorney, Agent, or Firm* — Oblon, McClelland, Maier & Neustadt, L.L.P.

(57) ABSTRACT

Provided are a resin composition, a pellet, a veil, a vibration damping material, a sound insulator, and an intermediate film for laminated glass, each of which is much more excellent in damping properties. Specifically, the resin composition is a resin composition containing the following block copolymer or hydrogenation product thereof (X); and a tackifier resin (Y) having a glass transition temperature of −50 to 45° C., wherein when a glass transition temperature of a polymer block (B) of the block copolymer or hydrogenation product thereof (X) is designated as Tg(X), and a glass transition temperature of the tackifier resin (Y) is designated as Tg(Y), an absolute value of a difference between Tg(X) and Tg(Y) is 50° C. or lower, the block copolymer or hydrogenation product thereof (X) being a block copolymer or a hydrogenation product thereof having a polymer block (A) containing more than 70 mol % of a structural unit derived from an aromatic vinyl compound and a polymer block (B) containing 30 mol % or more of a structural unit derived from at least one selected from the group consisting of a conjugated diene compound and isobutylene, and the content of the polymer block (A) in the block copolymer being 25% by mass or less.

19 Claims, 2 Drawing Sheets

RESIN COMPOSITION, PELLET, VEIL, DAMPING MATERIAL, SOUND INSULATION MATERIAL, AND INTERMEDIATE FILM FOR LAMINATED GLASS

TECHNICAL FILED

The present invention relates to a resin composition, a pellet, a veil, a vibration damping material, a sound insulator, and an intermediate film for laminated glass.

BACKGROUND ART

It is already known that a block copolymer having a polymer block containing a structural unit derived from an aromatic vinyl compound and a polymer block containing a structural unit derived from a conjugated diene compound and a hydrogenation product thereof are excellent in damping properties, and a resin composition containing the same has been utilized as a vibration damping material.

In recent years, vibration reduction and noise reduction of interiors of vehicles, such as automobiles, and reduction of sound and vibration generated due to spread of office machinery and equipment in ordinary homes and increase in size of household appliance have become important issues. In addition, even in outdoors, vibration reduction and noise reduction of structures, such as bridges, industrial machinery, and the like are advanced. For this reason, development of a material having much more excellent damping properties is demanded.

As the material having excellent damping properties, the following (i) to (iv) have been known up to date.

(i) An earthquake-resistant mat composition containing an elastomer (A) and at least one selected from a softening agent (B), a tackifier (C), and a plasticizer (D), wherein a peak of a loss tangent (tan δ) obtained by the dynamic viscoelasticity measurement of the composition in a shear mode appears at 20° C. or lower, the loss tangent (tan δ) is 0.4 or more at 20° C., and a storage modulus (G') at 20° C. is 1 MPa or less (see PTL 1).

(ii) A composition composed of 100 parts by weight of a block copolymer having a predetermined molecular weight and constituted of two or more blocks composed of a vinyl aromatic monomer having a predetermined number average molecular weight and one or more blocks having a vinyl bond content of 40% or more and composed of isoprene or isoprene-butadiene having a main dispersion peak of tan δ at 0° C. or higher; and 5 to 250 parts by weight of a tackifier resin having a softening point of 30° C. or higher (see PTL 2).

(iii) A shock-absorbing material composed of an elastomer composition including (A) 100 parts by mass of a hydrogenated block copolymer obtained by hydrogenation of a block copolymer composed of at least one polymer block mainly containing a vinyl aromatic compound and at least one polymer block mainly containing a conjugated diene compound; (B) 1 to 500 parts by mass of an oil as a softening agent; and (C) 0.1 to 50 parts by mass of a polyolefin-based resin as a processing aid; and also including (D) a resin for viscoelasticity adjustment, the elastomer composition having an Asker C hardness of 10 to 70 degree (see PTL 3).

(iv) A flexible composition including (a) 100 parts by weight of a block copolymer or a hydrogenation product thereof having a predetermined number average molecular weight and constituted of (A) a block composed of at least one vinyl aromatic monomer and having a predetermined number average molecular weight and (B) a block composed of isoprene, butadiene, or isoprene-butadiene and having the content of a 3,4-bond and a 1,2-bond of 30% or more, a peak temperature of tan δ of −20° C. or higher, and a peak value of tan δ of 0.3 or more; (b) 10 to 2,000 parts by weight of a softening agent; and (c) 10 to 2,000 parts by weight of a tackifier resin (see PTL 4).

CITATION LIST

Patent Literature

PTL 1: JP 2006-335997 A
PTL 2: JP 02-135256 A
PTL 3: JP 2010-275457 A
PTL 4: JP 06-293853 A

SUMMARY OF INVENTION

Technical Problem

According to investigations made by the present inventors, in all of the conventional technologies, thorough damping properties have been not always obtained. For that reason, development of a technology for improving more efficiently and more effectively the damping properties of a block copolymer or an hydrogenation product thereof is demanded.

Then, a problem of the present invention is to provide a resin composition, a pellet, a veil, a vibration damping material, a sound insulator, and an intermediate film for laminated glass, each of which is much more excellent in damping properties.

Solution to Problem

In order to solve the aforementioned problem, the present inventors made extensive and intensive investigations. As a result, it has become clear that when a specified block copolymer or a hydrogenation product thereof is combined with a tackifier resin having a predetermined glass transition temperature such that an absolute value of a difference between glass transition temperatures of the both is a predetermined temperature or lower, the damping properties are significantly improved, thereby leading to the present invention.

The present invention is concerned with the following [1] to [22].

[1] A resin composition containing the following block copolymer or hydrogenation product thereof (X); and a tackifier resin (Y) having a glass transition temperature of −50 to 45° C., wherein, when a glass transition temperature of a polymer block (B) of the block copolymer or hydrogenation product thereof (X) is designated as Tg(X), and a glass transition temperature of the tackifier resin (Y) is designated as Tg(Y), an absolute value of a difference between Tg(X) and Tg(Y) is 50° C. or lower, the block copolymer or hydrogenation product thereof (X): a block copolymer or a hydrogenation product thereof having a polymer block (A) containing more than 70 mol % of a structural unit derived from an aromatic vinyl compound and a polymer block (B) containing 30 mol % or more of a structural unit derived from at least one selected from the group consisting of a conjugated diene compound and isobutylene, wherein the content of the polymer block (A) in the block copolymer is 25% by mass or less.

[2] The resin composition as set forth in the above [1], wherein a molecular weight of the tackifier resin (Y) is from 100 to 10,000.
[3] The resin composition as set forth in the above [1] or [2], wherein the tackifier resin (Y) has an alicyclic skeleton.
[4] The resin composition as set forth in the above [1] or [2], wherein the tackifier resin (Y) contains an oxygen atom.
[5] The resin composition as set forth in any of the above [1] to [4], wherein an acid value of the tackifier resin (Y) is 100 mgKOH/g or less.
[6] The resin composition as set forth in any of the above [1] to [5], wherein the tackifier resin (Y) is at least one selected from the group consisting of a rosin-based resin, a phenol-based resin, and a coumarone-indene-based resin.
[7] The resin composition as set forth in the above [6], wherein the rosin-based resin is a hydrogenated or non-hydrogenated rosin ester.
[8] The resin composition as set forth in any of the above [1] to [7], wherein the tackifier resin (Y) is liquid at 25° C.
[9] The resin composition as set forth in any of the above [1] to [8], wherein a weight average molecular weight of the block copolymer or hydrogenation product thereof (X) is from 20,000 to 800,000.
[10] The resin composition as set forth in any of the above [1] to [9], wherein in the hydrogenation product, a hydrogenation rate of the polymer block (B) is from 80 to 99 mol %.
[11] The resin composition as set forth in any of the above [1] to [10], wherein in the block copolymer or hydrogenation product thereof (X), the conjugated diene compound is isoprene, butadiene, or a mixture of isoprene and butadiene.
[12] The resin composition as set forth in any of the above [1] to [11], wherein the content of the polymer block (A) in the block copolymer is from 1 to 15% by mass.
[13] The resin composition as set forth in any of the above [1] to [12], wherein a content proportion of the component (X) and the component (Y) [X/Y] is from 90/10 to 10/90 in terms of a mass ratio.
[14] The resin composition as set forth in any of the above [1] to [13], wherein a morphology of a film having a thickness of 1 mm, which is obtained by molding the block copolymer or hydrogenation product thereof (X) according to the following molding condition, has a microphase-separated structure of a sphere:
Molding condition: to apply a pressure at a temperature of 200° C. under a pressure of 10 MPa for 3 minutes.
[15] The resin composition as set forth in any of the above [1] to [14], wherein a morphology of a film having a thickness of 1 mm, which is obtained by molding the resin composition according to the following molding condition, has a microphase-separated structure of a sphere:
Molding condition: to apply a pressure at a temperature of 200° C. under a pressure of 10 MPa for 3 minutes.
[16] The resin composition as set forth in any of the above [1] to [15], wherein a ratio of a storage modulus G' (−5) at ((peak top temperature of tan δ)−5° C.) of the resin composition to a storage modulus G' (top) at the peak top temperature [G' (−5)/G' (top)] is 10 or more.
[17] The resin composition as set forth in any of the above [1] to [16], wherein a peak intensity of tan δ, which is measured under a condition at a strain amount of 0.1%, a frequency of 1 Hz, a measurement temperature of −70 to 200° C., and a temperature rise rate of 3° C./min in conformity with JIS K7244-10 (2005), is 2.5 or more.

[18] A pellet containing the resin composition as set forth in any of the above [1] to [17].
[19] A veil containing the resin composition as set forth in any of the above [1] to [17].
[20] A vibration damping material containing the resin composition as set forth in any of the above [1] to [17].
[21] A sound insulator containing the resin composition as set forth in any of the above [1] to [17].
[22] An intermediate film for laminated glass containing the resin composition as set forth in any of the above [1] to [17].

Advantageous Effects of Invention

In accordance with the present invention, it is possible to provide a resin composition, a pellet, a veil, a vibration damping material, a sound insulator, and an intermediate film for laminated glass, each of which is much more excellent in damping properties.

DESCRIPTION OF EMBODIMENTS

Figure 1:
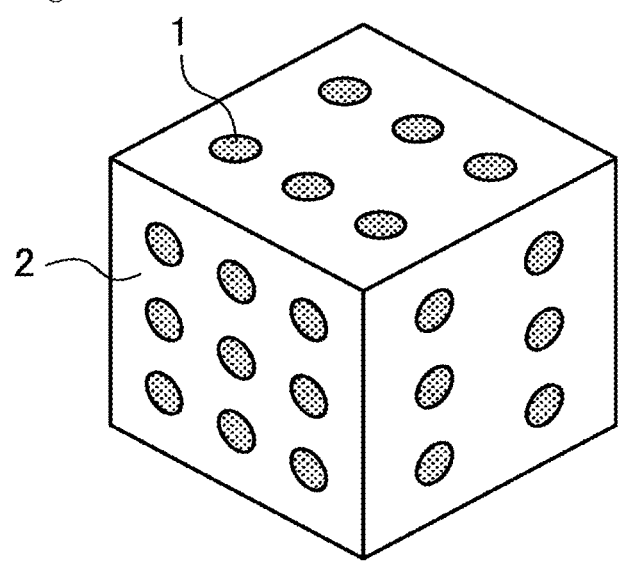
FIG. 1 is a diagrammatic view of a microphase-separated structure of a sphere.

The present invention is concerned with a resin composition containing the following block copolymer below or hydrogenation product thereof (X) [hereinafter sometimes referred to as "component (X)"]; and a tackifier resin (Y) having a glass transition temperature of −50 to 45° C. [hereinafter sometimes referred to as "component (Y)"], wherein
when a glass transition temperature of a polymer block (B) of the block copolymer or hydrogenation product thereof (X) is designated as Tg(X), and a glass transition temperature of the tackifier resin (Y) is designated as Tg(Y), an absolute value of a difference between Tg(X) and Tg(Y) is 50° C. or lower.

The absolute value of the difference between Tg(X) and Tg(Y), namely |Tg(X)−Tg(Y)|, is sometimes expressed as "|ΔTg|".

When the |ΔTg| is higher than 50° C., an effect for improving the damping properties is not obtained. From the viewpoint of damping properties, the |ΔTg| is preferably 45° C. or lower, more preferably 40° C. or lower, still more preferably 30° C. or lower, and especially preferably 20° C. or lower. Although a lower limit value of the |ΔTg| is not particularly limited, it may be 0° C., and may also be 0.5° C. By controlling the |ΔTg| to the aforementioned range, the component (X) and the component (Y) in the composition undergo glass transition at temperatures close to each other, and therefore, a value of [G' (−5)/G' (top)] that is a ratio of a storage modulus G' (−5) at ((peak top temperature of tan δ)−5° C.) of the resin composition to a storage modulus G' (top) at the peak top temperature as mentioned later becomes large, and a peak intensity of tan δ becomes high. Thus, the damping properties of the component (X) can be significantly improved. Namely, as compared with the damping properties of only the component (X), the damping properties of the resin composition containing the component (X) and the component (Y), in which the |ΔTg| falls within the aforementioned range, become significantly high.

In the present invention, the glass transition temperature was determined according to the method described in the section of Examples, specifically the following measurement method.

(Measurement Method of Glass Transition Temperature)

Using a differential scanning calorimeter, "DSC6200" (manufactured by Seiko Instruments Inc.), the component (X) was precisely weighed and subjected to temperature rise from −120° C. to 60° C. at a temperature rise rate of 10° C./min, and a temperature of an inflection point of the measurement curve was read out and defined as the glass transition temperature [Tg(X)] of the polymer block (B).

Using a differential scanning calorimeter, "DSC6200" (manufactured by Seiko Instruments Inc.), the component (Y) was precisely weighed and subjected to temperature rise from −120° C. to 100° C. at a temperature rise rate of 10° C./min, and a temperature of an inflection point of the measurement curve was read out and defined as the glass transition temperature [Tg(Y)] of the component (Y).

The component (X) and the component (Y) which the resin composition of the present invention contains are hereunder described in order.

[Block Copolymer or Hydrogenation Product Thereof (X)]

The component (X) is a block copolymer or a hydrogenation product thereof having a polymer block (A) containing more than 70 mol % of a structural unit derived from an aromatic vinyl compound and a polymer block (B) containing 30 mol % or more of a structural unit derived from at least one selected from the group consisting of a conjugated diene compound and isobutylene, wherein the content of the polymer block (A) in the block copolymer is 25% by mass or less.

The component (X) may be used alone or may be used in combination of two or more thereof.

(Polymer Block (A))

The polymer block (A) contains more than 70 mol % of a structural unit derived from an aromatic vinyl compound (hereinafter sometimes abbreviated as "aromatic vinyl compound unit"), and from the viewpoint of mechanical characteristics, the content of the aromatic vinyl compound unit is preferably 80 mol % or more, more preferably 85 mol % or more, still more preferably 90 mol % or more, and especially preferably 95 mol % or more, and it may also be substantially 100 mol %.

Examples of the aromatic vinyl compound include styrene, o-methylstyrene, m-methylstyrene, p-methylstyrene, α-methylstyrene, β-methylstyrene, 2,6-dimethylstyrene, 2,4-dimethylstyrene, α-methyl-o-methylstyrene, α-methyl-m-methylstyrene, α-methyl-p-methylstyrene, β-methyl-o-methylstyrene, β-methyl-m-methylstyrene, β-methyl-p-methylstyrene, 2,4,6-trimethylstyrene, α-methyl-2,6-dimethylstyrene, α-methyl-2,4-dimethylstyrene, β-methyl-2,6-dimethylstyrene, β-methyl-2,4-dimethylstyrene, o-chlorostyrene, m-chlorostyrene, p-chlorostyrene, 2,6-dichlorostyrene, 2,4-dichlorostyrene, α-chloro-o-chlorostyrene, α-chloro-m-chlorostyrene, α-chloro-p-chlorostyrene, β-chloro-o-chlorostyrene, β-chloro-m-chlorostyrene, β-chloro-p-chlorostyrene, 2,4,6-trichlorostyrene, α-chloro-2,6-dichlorostyrene, α-chloro-2,4-dichlorostyrene, β-chloro-2,6-dichlorostyrene, β-chloro-2,4-dichlorostyrene, o-t-butylstyrene, m-t-butylstyrene, p-t-butylstyrene, o-methoxystyrene, m-methoxystyrene, p-methoxystyrene, o-chloromethylstyrene, m-chloromethylstyrene, p-chloromethylstyrene, o-bromostyrene, m-bromostyrene, p-bromostyrene, a styrene derivative substituted with a silyl group, indene, and vinylnaphthalene. These aromatic vinyl compounds may be used alone or may be used in combination of two or more thereof. Above all, from the viewpoint of production costs and balance in physical properties, styrene, α-methylstyrene, p-methylstyrene, and a mixture thereof are preferred, with styrene being more preferred.

However, the polymer block (A) may contain a structural unit derived from an unsaturated monomer other than the aromatic vinyl compound (hereinafter sometimes abbreviated as "other unsaturated monomer unit") in a proportion of 30 mol % or less so long as the object and effects of the present invention are not impaired. As the other unsaturated monomer, for example, at least one selected from the group consisting of butadiene, isoprene, 2,3-dimethylbutadiene, 1,3-pentadiene, 1,3-hexadiene, isobutylene, methyl methacrylate, methyl vinyl ether, N-vinylcarbazole, β-pinene, 8,9-p-menthene, dipentene, methylene norbornene, and 2-methylenetetrahydrofuran is exemplified. The content of the structural unit derived from the aforementioned other unsaturated monomer in the polymer block (A) is preferably 20 mol % or less, more preferably 10 mol % or less, and still more preferably 5 mol %, and especially preferably, it is substantially 0 mol %.

The bonding mode in the case where the polymer block (A) contains the other unsaturated monomer unit is not particularly limited, and may be either random or tapered.

The block copolymer may include at least one aforementioned polymer block (A). In the case where the block copolymer includes two or more polymer blocks (A), those polymer blocks (A) may be the same as or different from each other. In this specification, the wording "different polymer blocks" means that at least one of the monomer units constituting the polymer block, the weight average molecular weight, the stereoregularity, and in the case where the block contains plural monomer units, the ratio of the monomer units and the copolymerization mode (random, gradient, or block) differs between the blocks.

Although a weight average molecular weight (Mw) of the polymer block (A) which the block copolymer has is not particularly limited, the weight average molecular weight of at least one polymer block (A) among the polymer blocks (A) which the block copolymer has is preferably 3,000 to 60,000, and more preferably 4,000 to 50,000. When the block copolymer has at least one polymer block (A) having a weight average molecular weight falling within the aforementioned range, the mechanical strength is more improved.

The "weight average molecular weight" described in this specification and the claims is everywhere a weight average molecular weight expressed in terms of standard polystyrene as determined through the gel permeation chromatography (GPC). The weight average molecular weight of each of the polymer blocks (A) which the block copolymer has can be determined by measuring the liquid sampled every time after the polymerization to give each polymer block in the production process. In addition, for example, in the case of a triblock copolymer having a structure of A1-B-A2, the weight average molecular weights of the first polymer block A1 and the polymer block B are measured by the aforementioned method, and by subtracting these from the weight average molecular weight of the block copolymer, the weight average molecular weight of the second polymer block A2 can be determined. In addition, as another method, in the case of the triblock copolymer having a structure of A1-B-A2, the weight average molecular weight of the total of the polymer block (A) can be calculated from the weight average molecular weight of the block copolymer and the total content of the polymer block (A) as confirmed through the $^1$H-NMR measurement, in which the weight average molecular weight of the deactivated first polymer block A1 is calculated through the GPC measurement, and by subtracting it, the weight average molecular weight of the second polymer block A2 can be obtained, too.

The content of the polymer block (A) in the block copolymer (in the case of having plural polymer blocks (A), the total content thereof) is 25% by mass or less from the viewpoint of damping properties. When the content of the polymer block (A) is more than 25% by mol, even if the |ΔTg| falls within the aforementioned range, the effect for improving the damping properties is not obtained.

Although a lower limit value of the content of the polymer block (A) is not particularly limited, when the content of the polymer block (A) is less than 1% by mass, there is a tendency that it becomes difficult to form a pellet of the block copolymer or hydrogenation product thereof (X).

From the same viewpoint, the content of the polymer block (A) is preferably 1 to 25% by mass, more preferably 1 to 22% by mass, still more preferably 1 to 18% by mass, and especially preferably 1 to 15% by mass, and it may also be 1 to 10% by mass, or may also be 3 to 8% by mass. In addition, from the viewpoint of the mechanical characteristics, the content of the polymer block (A) is preferably 6 to 18% by mass, more preferably 6 to 15% by mass, still more preferably 8 to 15% by mass, and especially preferably 10 to 15% by mass.

The content of the polymer block (A) in the block copolymer is a value determined through $^1$H-NMR spectra, and in more detail, it is a value measured according to the method described in the section of Examples.

(Polymer Block (B))

The polymer block (B) contains a structural unit derived from at least one selected from the group consisting of a conjugated diene compound and isobutylene in an amount of 30 mol % or more, preferably 50 mol % or more, more preferably 65 mol % or more, and still more preferably 80 mol % or more.

The polymer block (B) may contain 30 mol % or more of a structural unit derived from a conjugated diene compound, may contain 30 mol % or more of a structural unit derived from isobutylene, or may contain 30 mol % or more of a structural unit derived from a mixture of a conjugated diene compound and isobutylene. In addition, the polymer block (B) may contain only a structural unit derived from one conjugated diene compound or may contain a structural unit derived from two or more conjugated diene compounds.

Examples of the conjugated diene compound include isoprene, butadiene, hexadiene, 2,3-dimethyl-1,3-butadiene, 1,3-pentadiene, and myrcene. Above all, isoprene, butadiene, and a mixture of isoprene and butadiene are preferred, and any of these compounds may be used. Among these, isoprene is more preferred. In the case of a mixture of butadiene and isoprene, though a mixing ratio thereof [isoprene/butadiene] (mass ratio) is not particularly limited, it is preferably 5/95 to 95/5, more preferably 10/90 to 90/10, still more preferably 40/60 to 70/30, and especially preferably 45/55 to 65/35. When the mixing ratio [isoprene/butadiene] is expressed in terms of a molar ratio, it is preferably 5/95 to 95/5, more preferably 10/90 to 90/10, still more preferably 40/60 to 70/30, and especially preferably 45/55 to 55/45.

As mentioned above, it is preferred that the polymer block (B) contains 30 mol % or more of a structural unit derived from a conjugated diene compound; it is also preferred that the polymer block (B) contains 30 mol % or more of a structural unit derived from isoprene (hereinafter sometimes abbreviated as "isoprene unit"); it is also preferred that the polymer block (B) contains 30 mol % or more of a structural unit derived from butadiene (hereinafter sometime abbreviated as "butadiene unit"); and it is also preferred that the polymer block (B) contains 30 mol % or more of a structural unit derived from a mixture of isoprene and butadiene (hereinafter sometimes abbreviated as "mixture unit of isoprene and butadiene").

In the case where the polymer block (B) has two or more structural units, the bonding mode thereof can be random, tapered, completely alternate, partially block, or block, or may be in the form of a combination of two or more thereof.

In the case where the structural unit constituting the polymer block (B) is any one of an isoprene unit, a butadiene unit, and a mixture unit of isoprene and butadiene, as the bonding mode of each of isoprene and butadiene, in the case of butadiene, the 1,2-bond and the 1,4-bond can be taken, and in the case of isoprene, the 1,2-bond, the 3,4-bond, and the 1,4-bond can be taken.

In the block copolymer, the total of the contents of the 3,4-bond unit and the 1,2-bond unit (hereinafter sometimes referred to as "vinyl bond amount") in the polymer block (B) is preferably 20 mol % or more, more preferably 40 mol % or more, and still more preferably 50 mol % or more. In addition, though there is no particular limitation, the vinyl bond amount of the polymer block (B) is preferably 90 mol % or less, and more preferably 85 mol % or less. Here, the vinyl bond amount is a value calculated through the $^1$H-NMR measurement according to the method described in the section of Examples.

In the case where the polymer block (B) is composed only of butadiene, the aforementioned wording "contents of the 3,4-bond unit and the 1,2-bond unit" is replaced with the wording "content of the 1,2-bond unit" and applied.

From the viewpoint of damping properties and so on, a weight average molecular weight of the total of the polymer block (B) which the block copolymer has is preferably 15,000 to 800,000, more preferably 50,000 to 700,000, still more preferably 70,000 to 600,000, especially preferably 90,000 to 500,000, and most preferably 130,000 to 450,000 in the state before the hydrogenation.

The polymer block (B) may contain a structural unit derived from a polymerizable monomer other than the conjugated diene compound and isobutylene so long as the object and effects of the present invention are not impaired. In this case, in the polymer block (B), the content of the structural unit derived from a polymerizable monomer other than the conjugated diene compound and isobutylene is preferably less than 70 mol %, more preferably less than 50 mol %, still more preferably less than 35 mol %, and especially preferably less than 20 mol %, and it may also be 5 to 15 mol %.

Preferred examples of the other polymerizable monomer include at least one compound selected from the group consisting of aromatic vinyl compounds, such as styrene, α-methylstyrene, o-methylstyrene, m-methylstyrene, p-methylstyrene, p-t-butylstyrene, 2,4-dimethylstyrene, vinylnaphthalene, and vinylanthracene; as well as methyl methacrylate, methyl vinyl ether, N-vinylcarbazole, β-pinene, 8,9-p-menthene, dipentene, methylene norbornene, 2-methylenetetrahydrofuran, 1,3-cyclopentadiene, 1,3-cyclohexadiene, 1,3-cycloheptadiene, and 1,3-cyclooctadiene. Above all, styrene, α-methylstyrene, and p-methylstyrene are preferred, with styrene being more preferred.

In the case where the polymer block (B) contains a structural unit derived from a polymerizable monomer other than the conjugated diene compound and isobutylene, a specific combination thereof is preferably isoprene and styrene, butadiene and styrene, and a mixture of isoprene and butadiene with styrene, and more preferably isoprene and styrene and a mixture of isoprene and butadiene with styrene.

In the case where the polymer block (B) contains a structural unit derived from a polymerizable monomer other than the conjugated diene compound and isobutylene, the bonding mode thereof is not particularly limited, and it may be any of random and tapered ones.

The block copolymer may contain at least one aforementioned polymer block (B). In the case where the block copolymer has two or more polymer blocks (B), those polymer blocks (B) may be the same as or different from each other.

(Bonding Mode of Polymer Block (A) and Polymer Block (B))

In the block copolymer, so long as the polymer block (A) and the polymer block (B) bond to each other, the bonding mode thereof is not particularly limited, and it may be any one of a linear bonding mode, a branched bonding mode, and a radial bonding mode, or a combination of two or more thereof. Above all, the bonding mode of the polymer block (A) and the polymer block (B) is preferably a linear bonding mode, and examples thereof include, when the polymer block (A) is represented by A, and the polymer block (B) is represented by B, a diblock copolymer represented by A-B, a triblock copolymer represented by A-B-A or B-A-B, a tetrablock copolymer represented by A-B-A-B, a pentablock copolymer represented by A-B-A-B-A or B-A-B-A-B, and an (A-B)nX type copolymer (wherein X represents a coupling agent residue, and n represents an integer of 3 or more). Above all, a linear triblock copolymer or diblock copolymer is preferred, and an A-B-A type triblock copolymer is preferably used from the viewpoint of damping properties, flexibility, easiness of production, and so on.

Here, in this specification, in the case where polymer blocks of the same kind bond linearly via a bifunctional coupling agent or the like, all the bonding polymer blocks are dealt with as one polymer block. According to this, including the aforementioned exemplifications, the polymer block to be strictly expressed as Y-X-Y (wherein X represents a coupling residue) is expressed as Y as a whole except for the case where it must be specifically differentiated from a single polymer block Y. In this specification, the polymer block of this kind that contains a coupling agent residue is dealt with as above, and therefore, for example, a block copolymer that contains a coupling agent residue and is to be strictly expressed as A-B-X-B-A (wherein X represents a coupling agent residue) is expressed as A-B-A and is dealt with as an example of a triblock copolymer.

In the present invention, the block copolymer (namely, the non-hydrogenated block copolymer) may be used as it is, and the hydrogenation product of the block copolymer (also referred to as "hydrogenated block copolymer") may also be used.

From the viewpoint of heat resistance, weather resistance, and damping properties, the carbon-carbon double bond which the polymer block (B) has is hydrogenated in a rate of preferably 80 mol % or more, more preferably 85 mol % or more, and still more preferably 88 mol % or more. The foregoing value is sometimes referred to as "hydrogenation rate". Although an upper limit value of the hydrogenation rate is not particularly limited, the upper limit value may be 99 mol %, and may also be 98 mol %.

Meanwhile, in the case of taking into consideration performing crosslinking or foaming, the hydrogenation rate may be 50 mol % or less, and it is preferably 10 mol % or less, more preferably 5 mol % or less, and still more preferably 3 mol % or less.

The hydrogenation rate is a value obtained by determining the content of the carbon-carbon double bond in the structural unit derived from the conjugated diene compound in the polymer block (B) through the $^1$H-NMR measurement after the hydrogenation, and in more detail, it is a value measured according to the method described in the section of Examples.

(Weight Average Molecular Weight (Mw) of Block Copolymer or Hydrogenation Product Thereof (X))

The weight average molecular weight (Mw) of the block copolymer or hydrogenation product thereof (X) as expressed in terms of standard polystyrene by means of the gel permeation chromatography is preferably 20,000 to 800,000, more preferably 50,000 to 700,000, still more preferably 70,000 to 600,000, especially preferably 90,000 to 500,000, and most preferably 130,000 to 450,000. When the weight average molecular weight of the block copolymer or hydrogenation product thereof (X) is 20,000 or more, the heat resistance becomes high, and when it is 800,000 or less, the moldability becomes favorable.

So long as the object and effects of the present invention are not impaired, the block copolymer or hydrogenation product thereof (X) may have one or more functional groups, such as a carboxy group, a hydroxy group, an acid anhydride group, an amino group, and an epoxy group, in a molecular chain and/or a molecular end, and it may also be one not having a functional group.

(Morphology)

Figure 2:
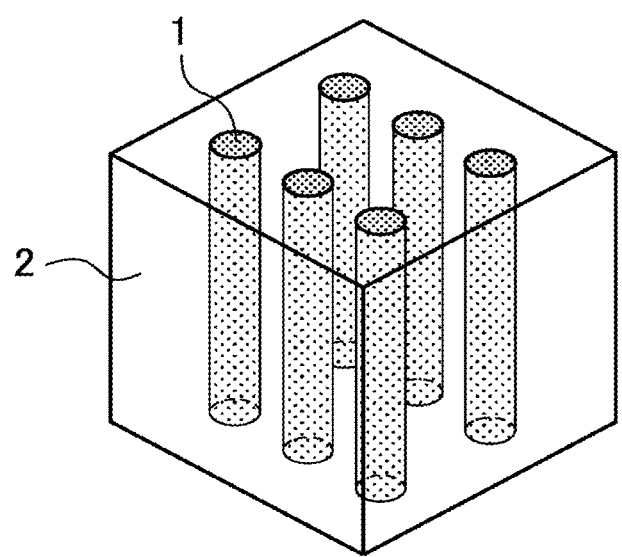
FIG. 2 is a diagrammatic view of a microphase-separated structure of a cylinder.

It is preferred that the morphology of a film having a thickness of 1 mm, which is obtained by molding the block copolymer or hydrogenation product thereof (X) under a pressurizing condition at a temperature of 200° C. and a pressure of 10 MPa for 3 minutes, has a microphase-separated structure of a sphere as illustrated in FIG. 1 or a cylinder as illustrated in FIG. 2. In the case where the morphology of the film has a microphase-separated structure of a sphere, the polymer block (A) becomes spherical and exists in the polymer block (B), whereas in the case where the morphology of the film has a microphase-separated structure of a cylinder, the polymer block (A) becomes cylindrical and exists in the polymer block (B). As the content of the polymer block (A) is smaller, the morphology of the film tends to have a microphase-separated structure of a sphere.

In view of the fact that the morphology of the film obtained through molding as mentioned above has a microphase-separated structure of a sphere or cylinder, the damping properties become much higher. From the same viewpoint, it is more preferred that the morphology of the film has a microphase-separated structure of a sphere.

Figure 3:
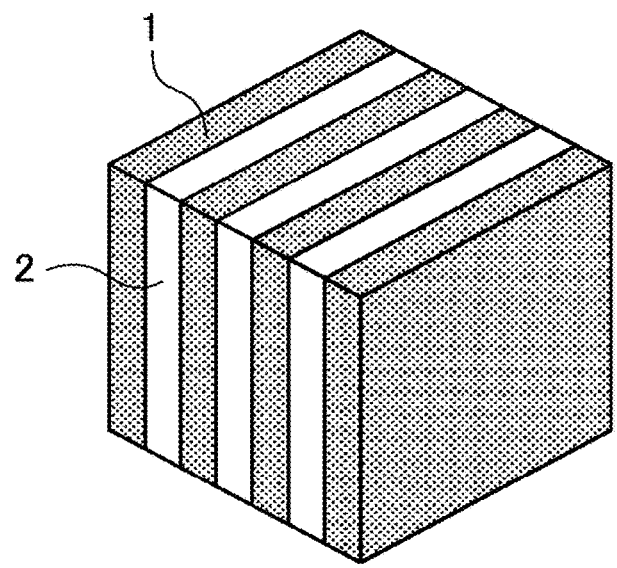
FIG. 3 is a diagrammatic view of a microphase-separated structure of a lamella.

As illustrated in FIG. 3, in the case where the film has a microphase-separated structure of a lamella structure where a layer of the polymer block (A) and a layer of the polymer block (B) are alternately superimposed, the film is poor in the moldability and the damping properties.

(Production Method of Block Copolymer or Hydrogenation Product Thereof (X))

The block copolymer or hydrogenation product thereof (X) can be produced according to a solution polymerization method, an emulsion polymerization method, a solid-phase polymerization method, or the like. Above all, a solution polymerization method is preferred, and for example, a known method, such as an ionic polymerization method, e.g., anionic polymerization and cationic polymerization, or a radical polymerization method, is applicable. Above all, an anionic polymerization method is preferred. In the anionic polymerization method, an aromatic vinyl compound and at least one selected from the group consisting of a conjugated diene compound are successively added in the presence of a solvent, an anionic polymerization initiator, and optionally, a Lewis base, to obtain a block copolymer, and optionally, a coupling agent is added to allow the mixture to react with each other, whereby a desired block copolymer is obtained. In addition, if desired, by subjecting the block copolymer to hydrogenation, the hydrogenated block copolymer can be obtained. In the cationic polymerization method, the hydrogenated block copolymer can be, for example, produced by polymerizing stepwise a monomer composed mainly of an aromatic vinyl compound and a monomer composed mainly of isobutylene in an arbitrary order in an inert solvent, such as hexane and methylene chloride, in the presence of a Lewis acid and an initiator system constituted of an organic compound that forms a cationic polymerization active species through a combination with the Lewis acid and optionally, in the co-presence of an additive, such as a pyridine derivative and an amide, thereby successively forming the respective polymer blocks. In that case, examples of the Lewis acid include titanium tetrachloride, boron trichloride, aluminum chloride, and tin tetrachloride. In addition, examples of the organic compound that forms a cationic polymerization active species include organic compounds having a functional group, such as an alkoxy group, an acyloxy group, and a halogen atom, and specific examples thereof include bis(2-methoxy-2-propyl)benzene, bis(2-acetoxy-2-propyl)benzene, and bis(2-chloro-2-propyl)benzene. In addition, examples of the amide include dimethylacetamide and dimethylformamide.

In the aforementioned method, examples of an organic lithium compound which may be used as the polymerization initiator for anionic polymerization include methyllithium, ethyllithium, n-butyllithium, sec-butyllithium, tert-butyllithium, and pentyllithium. In addition, examples of a dilithium compound which may be used as the polymerization initiator include naphthalenedilithium and dilithiohexylbenzene.

Examples of the coupling agent include dichloromethane, dibromomethane, dichloroethane, dibromoethane, dibromobenzene, and phenyl benzoate.

The use amount of each of the polymerization initiator and the coupling agent is suitably determined depending on the desired weight average molecular weight of the target block copolymer or hydrogenation product thereof. In general, the initiator, such as an alkyllithium compound and a dilithium compound, is used preferably in a proportion of 0.01 to 0.2 parts by mass based on 100 parts by mass of a total amount of the monomers to be used for the polymerization, inclusive of an aromatic vinyl compound, butadiene, and isoprene. In the case where the coupling agent is used, a use proportion thereof is preferably 0.001 to 0.8 parts by mass based on 100 parts by mass of a total amount of the monomers.

The solvent is not particularly limited so long as it does not adversely affect the anionic polymerization reaction. Examples thereof include aliphatic hydrocarbons, such as cyclohexane, methylcyclohexane, n-hexane, and n-pentane; and aromatic hydrocarbons, such as benzene, toluene, and xylene. In addition, the polymerization reaction is performed at a temperature of typically 0 to 100° C., and preferably 10 to 70° C. for 0.5 to 50 hours, and preferably 1 to 30 hours.

In the case where the polymer block (B) of the block copolymer is a structural unit derived from a conjugated diene, the content of each of the 3,4-bond and the 1,2-bond of the polymer block (B) can be increased by a method of adding a Lewis base as a co-catalyst on the occasion of polymerization.

Examples of the Lewis base which can be used include ethers, such as dimethyl ether, diethyl ether, and tetrahydrofuran; glycol ethers, such as ethylene glycol dimethyl ether and diethylene glycol dimethyl ether; and amines, such as triethylamine, N,N,N',N'-tetramethylenediamine, and N-methylmorpholine. These Lewis bases may be used alone or may be used in combination of two or more thereof.

In the case where the polymer block (B) contains a structural unit derived from a conjugated diene compound, in particular, isoprene and/or butadiene, the addition amount of the Lewis base is determined depending upon the intended vinyl bonding amount of the isoprene unit and/or the butadiene unit constituting the polymer block (B). For that reason, though the addition amount of the Lewis base is not strictly limited, it is preferred to use the Lewis base in an amount in a range of typically 0.1 to 1,000 mol, and preferably from 1 to 100 mol per gram atom of lithium contained in the alkyllithium compound or the dilithium compound to be used as the polymerization initiator.

After performing the polymerization according to the aforementioned method, an active hydrogen compound, such as an alcohol, a carboxylic acid, and water, is added to stop the polymerization reaction. Thereafter, in the case of obtaining the hydrogenated block copolymer, a hydrogenation reaction is performed in an inert organic solvent in the presence of a hydrogenation catalyst. The hydrogenation reaction can be carried out under a hydrogen pressure of 0.1 to 20 MPa, preferably 0.5 to 15 MPa, and more preferably 0.5 to 5 MPa at a reaction temperature of 20 to 250° C., preferably 50 to 180° C., and more preferably 70 to 180° C. for a reaction time of typically 0.1 to 100 hours, and preferably 1 to 50 hours.

Examples of the hydrogenation catalyst include Raney nickel; a heterogeneous catalyst having a metal, such as Pt, Pd, Ru, Rh, and Ni, supported on an elemental substance, such as carbon, alumina, and diatomaceous earth; a Ziegler-based catalyst composed of a combination of a transition metal compound with an alkylaluminum compound, an alkyllithium compound, or the like; and a metallocene-based catalyst.

The block copolymer or hydrogenation product thereof (X) thus obtained can be acquired by solidification by pouring the polymerization reaction liquid into methanol or the like, followed by heating or drying under reduced pressure; or subjecting to so-called steam stripping by pouring the polymerization reaction liquid into hot water together with steam and subjecting the solvent to azeotropic removal, followed by heating or drying under reduced pressure.

[Tackifier Resin (Y) Having a Glass Transition Temperature of −50 to 45° C.]

The resin composition of the present invention contains, as the component (Y), a tackifier resin having a glass transition temperature [Tg(Y)] of −50 to 45° C. together with the component (X). The component (Y) may be used alone or may be used in combination of two or more thereof.

As for the component (Y), one having a glass transition temperature of −50 to 45° C. may be selected among known tackifier resins. Namely, one having the foregoing glass transition temperature may be utilized among specific examples as mentioned later. From the viewpoint of damping properties, the glass transition temperature of the component (Y) is preferably −50 to 15° C., more preferably −40 to 0° C., still more preferably −35 to −5° C., especially preferably −35 to −15° C., and most preferably −35 to −20° C. It may also be said that the component (Y) is preferably a tackifier resin that is liquid at 25° C.

Now, in the present invention, in view of the fact that the foregoing tackifier resin is contained as the component (Y), pressure-sensitive adhesiveness may be imparted to the resin composition; however, it is not the case where the component (Y) is contained merely for the purpose of imparting the pressure-sensitive adhesiveness, but the tackifier resin is used for the purpose of much more enhancing the damping properties of the component (X). Namely, as mentioned above, by selecting a combination of the component (X) and the component (Y) so as to allow the |ΔTg| to satisfy the aforementioned range, the damping properties of the resin composition can be significantly enhanced.

Although a molecular weight of the component (Y) is not particularly limited, it is preferably 100 to 10,000, more preferably 100 to 5,000, still more preferably 150 to 3,000, especially preferably 150 to 1,000, and most preferably 200 to 600 in terms of a weight average molecular weight. By regulating the molecular weight of the component (Y) to the aforementioned lower limit value or more, it becomes easy to suppress bleed-out, whereas by regulating the molecular weight of the component (Y) to the aforementioned upper limit value or less, the matter that the glass transition temperature becomes excessively high can be suppressed.

From the viewpoint of damping properties, an acid value of the component (Y) is preferably 100 mgKOH/g or less, more preferably 60 mgKOH/g or less, still more preferably 30 mgKOH/g or less, yet still more preferably 10 mgKOH/g or less, especially preferably 3 mgKOH/g or less, and most preferably 1 mgKOH/g or less.

Here, so far as commercially available products are concerned, the acid value can be made by reference to catalog values, and it can also be determined by the potentiometric titration method in conformity with JIS K0700 (1992).

More specifically, examples of the component (Y) include a rosin-based resin, a terpene-based resin, a phenol-based resin, a xylene-based resin, a coumarone-indene-based resin, a (hydrogenated) petroleum resin, and a styrene-based resin (provided that the component (X) is excluded). The component (Y) may be used alone or may be used in combination of two or more thereof. In addition, as for the component (Y), a tackifier resin having an alicyclic skeleton is a preferred embodiment; a tackifier resin having an oxygen atom is also a preferred embodiment; and a tackifier resin having an alicyclic skeleton and an oxygen atom is a preferred embodiment, too.

Above all, from the viewpoint of damping properties, the component (Y) is preferably at least one selected from a rosin-based resin, a phenol-based resin, and a coumarone-indene-based resin, and more preferably a rosin-based resin.

Examples of the rosin-based resin include rosins, such as gum rosin, tall oil rosin, and wood rosin; modified rosins, such as hydrogenated rosin, disproportionated rosin, and polymerized rosin; and hydrogenated or non-hydrogenated rosin esters that are an ester compound of the foregoing rosin or modified rosin and an alcohol, for example, a methyl ester, an ethyl ester, a propyl ester, a glycerin ester, and a pentaerythritol ester. From the viewpoint of damping properties, the rosin-based resin is preferably a hydrogenated or non-hydrogenated rosin ester. From the viewpoint of decreasing the glass transition temperature, the ester site of the hydrogenated or non-hydrogenated rosin ester is preferably a methyl ester, an ethyl ester, or a propyl ester. As for the rosin-based resin, a commercially available rosin-based resin may be used as it is, or a purified rosin-based resin may be used. In addition, one of specified organic acids which are included in the rosin-based resin (for example, abietic acid, neoabietic acid, palustric acid, pimaric acid, isopimaric acid, and palustric acid) and modified products of the foregoing organic acids may be used alone or may be used in combination of two or more thereof.

Examples of the terpene-based resin include a terpene resin composed mainly of α-pinene, β-pinene, dipentene, or the like, an aromatic modified terpene resin, a hydrogenated terpene resin, and a terpene phenol resin.

Examples of the (hydrogenated) petroleum resin include a (hydrogenated) aliphatic ($C_5$-based) petroleum resin, a (hydrogenated) aliphatic ($C_9$-based) petroleum resin, a (hydrogenated) copolymer-based ($C_5/C_9$-based) petroleum resin, and a (hydrogenated) dicyclopentadiene-based petroleum resin.

Examples of the styrene-based resin include poly-α-methylstyrene, an α-methylstyrene/styrene copolymer, a styrene-based monomer/aliphatic monomer copolymer, a styrene-based monomer/α-methylstyrene/aliphatic monomer copolymer, a styrene-based monomer copolymer, and a styrene-based monomer/aromatic monomer copolymer.

The component (Y) is preferably one in which a peak appears at 6 to 8 ppm in the $^1$H-NMR measurement of the component (Y), from the viewpoint of compatibility with the component (X).

(Content Proportion of Component (X) and Component (Y))

In the resin composition of the present invention, a content proportion of the component (X) and the component (Y) [X/Y] is preferably 90/10 to 10/90, more preferably 90/10 to 30/70, still more preferably 80/20 to 30/70, yet still more preferably 80/20 to 40/60, especially preferably 70/30 to 50/50, and most preferably 70/30 to 55/45 in terms of a mass ratio.

By regulating the content proportion of the component (Y) to the aforementioned predetermined amount or more, the effect for improving the damping properties tends to become satisfactory. In addition, by controlling the content proportion of the component (Y) small, there is a tendency that not only lowering in mechanical characteristics and moldability is suppressed, but also bleed-out of the component (Y) from the resin composition is readily suppressed.

[Other Components]

The resin composition of the present invention may contain other component than the component (X) and the component (Y), as the need arises. Examples thereof include a softening agent, a filler, an antioxidant, a heat stabilizer, a light stabilizer, a UV absorbent, a neutralizing agent, a lubricant, an anti-fogging agent, an antiblocking agent, a water repellent, a waterproof agent, a coloring agent, a fluorescent brightener, a flame retardant, an antistatic agent, an electroconductivity imparting agent, an antimicrobial agent, an antifungal agent, a thermal conductivity imparting agent, an electromagnetic wave shieldability imparting agent, a crosslinking agent, a crosslinking aid, a crosslinking promoter, a foaming agent, a foaming aid, a processing aid, a pigment, and a dye.

Examples of the softening agent include mineral oils, such as a paraffinic process oil and a naphthenic process oil; vegetable oils, such as peanut oil and rosin; a phosphoric acid ester; low-molecular weight polyethylene glycol; liquid paraffin; and synthetic oils, such as low-molecular weight ethylene, an ethylene-α-olefin copolymer oligomer, liquid polybutene, liquid polyisoprene or a hydrogenation product thereof, and liquid polybutadiene or a hydrogenation product thereof.

Although the resin composition of the present invention may contain a softening agent, it is preferred that the softening agent is contained to an extent that it does not influence a mechanism which the effects of the present invention are revealed. For example, the content of the softening agent is preferably 50 parts by mass or less, more preferably 40 parts by mass or less, still more preferably 30 parts by mass or less, and especially preferably 10 parts by mass or less based on 100 parts by mass of the component (X), and an embodiment not substantially containing the softening agent is also preferred. This is because when the content of the softening agent increases, the glass transition temperature of the composition tends to decrease, and therefore, a peak top temperature of tan δ as mentioned later decreases, and a peak top frequency of tan δ at 20° C. increases, whereby the frequency at which the damping properties are revealed increases, and for example, such is not preferred in the case of using the resin composition as a vibration damping material.

Although the resin composition of the present invention may contain the aforementioned other component than the softening agent, it is preferred that the other component is contained to an extent that it does not influence a mechanism which the effects of the present invention are revealed. For example, the content of the other component is preferably 50 parts by mass or less, more preferably 40 parts by mass or less, still more preferably 30 parts by mass or less, and especially preferably 10 parts by mass or less in terms of a sum total of the other components (provided that the softening agent is excluded) based on 100 parts by mass of the component (X), and an embodiment not substantially containing the other component is also preferred.

(Preparation Method of Resin Composition)

The resin composition of the present invention is not particularly limited with respect to its preparation method and can be prepared by utilizing a known method. For example, the resin composition of the present invention can be prepared by mixing the components (X) and (Y) and optionally, other component by using a mixing machine, such as a Henschel mixer, a V blender, a ribbon blender, a tumbler blender, and a conical blender, or after thus mixed, melt-kneading the resulting mixture with a kneading machine, such as a single-screw extruder, a twin-screw extruder, a kneader, a Banbury mixer, and a roll at 80 to 250° C. In addition, the resin composition can also be prepared by dissolving the respective components [at least the component (X) and the component (Y)] in a solvent capable of dissolving the respective components therein and mixing, followed by removing the solvent. In the case of preparing a resin composition composed of two kinds of the component (X) and the component (Y), the latter method is simple and easy, and hence, is preferred.

In the case of performing foaming, for example, the foamed product can be obtained by performing injection foam molding of the resin composition having a foaming agent dry-blended therein in a die provided with a cavity having a desired shape.

(Pellet and Veil)

The thus obtained resin composition (in particular, the non-foamed resin composition) can be formed in a pellet by a method, such as hot cutting. In addition, the resin composition can also be formed in a veil by molding with a veil molding machine. Namely, the present invention also provides a pellet or a veil each containing the resin composition.

(Peak Top Intensity of tan δ)

The resin composition of the present invention is pressurized at a temperature of 200° C. and a pressure of 10 MPa for 3 minutes to produce a single-layer sheet having a thickness of 1.0 mm, and the single-layer sheet is cut out in a disk shape, to prepare a test piece. Using the test piece, its peak top intensity of tan δ as measured under a condition at a strain amount of 0.1%, a frequency of 1 Hz, a measurement temperature of −70 to 200° C., and a temperature rise rate of 3° C./min in conformity of JIS K7244-10 (2005) may be 2.5 or more, and therefore, the resultant is excellent in clamping properties. As for one having a higher peak top intensity of tan δ, the value may be 2.8 or more, further 3.0 or more, still further 3.3 or more, and yet still further 3.5 or more. Although an upper limit value of the peak top intensity of tan δ is not particularly limited, it tends to become 4.5 or less, and in many cases, it tends to become 4.2 or less.

Furthermore, when a test piece is produced according to the aforementioned method by using only the component (X) in place of the resin composition, and a peak top intensity of tan δ as measured by the same method is made as a basis, a difference (Δ tan δ) of the peak top intensity of tan δ obtained using the resin composition therefrom tends to become preferably +0.5 or more, more preferably +0.7 or more, still more preferably +0.9 or more, and especially preferably +1.0 or more, and it may be said that the damping properties of the resin composition of this application are significantly improved as compared with the case of single use of the component (X).

The peak top intensity of tan δ indicates a value of tan δ when the peak of tan δ is maximum. In more detail, the measurement method of the peak top intensity of tan δ is one described in the section of Examples.

Figure 4:
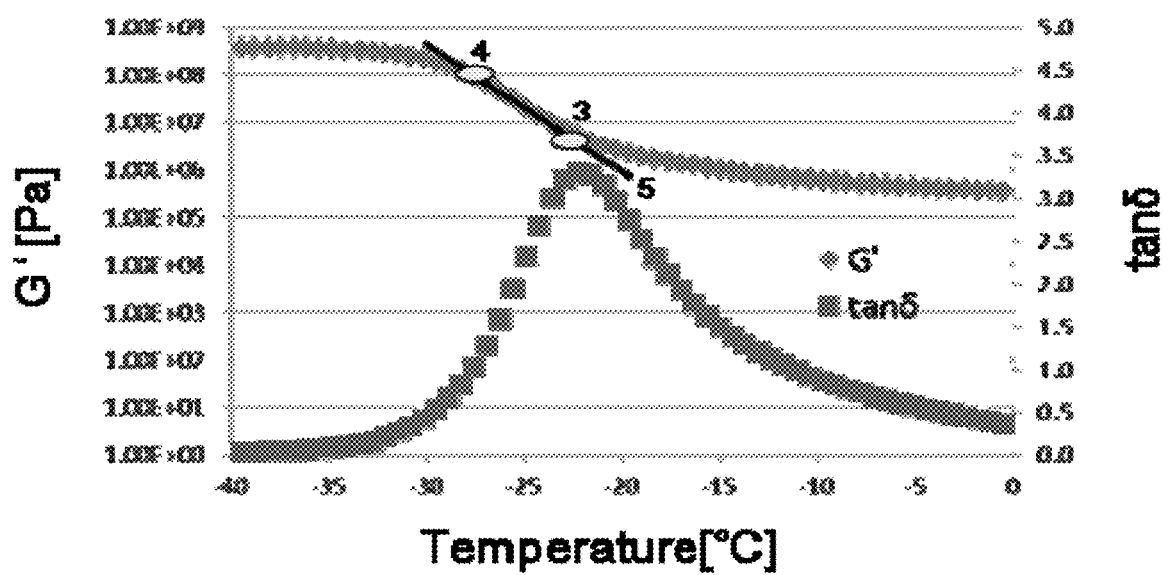
FIG. 4 is a graph for explaining a ratio of a storage modulus G' (−5) at ((peak top temperature of tan δ)−5° C.) of the resin composition to a storage modulus G' (top) at the peak top temperature [G' (−5)/G' (top)].

As for the resin composition of the present invention, from the viewpoint of damping properties, a ratio of a storage modulus G' (−5) at ((peak top temperature of tan δ)−5° C.) of the resin composition (see "4" in FIG. 4) to a storage modulus G' (top) at the peak top temperature (see "3" in FIG. 4) [G' (−5)/G' (top)] (corresponding to a gradient 5 of a straight line connecting "3" and "4" in FIG. 4) is preferably 10 or more, more preferably 12 or more, and still preferably 13 or more, and it may be occasionally 14 or more or 15 or more. Although an upper limit value of the foregoing ratio is not particularly limited, in general, it tends to become 20 or less. The peak top temperature of tan δ indicates a temperature when the peak of tan δ is maximum. The numerical values in FIG. 4 are those for reference, and it should be construed that the present invention is by no means influenced by the described numerical values.

In a temperature range of from ((peak top temperature of tan δ)−5° C.) to (peak top temperature of tan δ), in view of the fact that the polymer block (B) of the component (X) in the resin composition is soft, and a head of the storage modulus G' (the gradient 5 of a straight line connecting "3" and "4" in FIG. 4) in the foregoing temperature range is large, the peak top intensity of tan δ is improved, and the effect for improving the damping properties tends to become more remarkable. Namely, in view of the matter that not only the |ΔTg| falls within the aforementioned range, but also the G' (−5)/G' (top) falls within the aforementioned range, the effect for improving the damping properties tends to become much more remarkable.

The storage modulus is a value determined according to the following measurement method.

(Measurement Method of Storage Modulus)

The resin composition of the present invention is pressurized at a temperature of 200° C. and a pressure of 10 MPa for 3 minutes to produce a single-layer sheet having a thickness of 1.0 mm, and the single-layer sheet is cut out in a disk shape, to prepare a test piece. Using the test piece, its storage modulus is measured under a condition at a strain amount of 0.1%, a frequency of 1 Hz, a measurement temperature of −70 to 200° C., and a temperature rise rate of 3° C./min in conformity of JIS K7244-10 (2005).

Here, the peak top temperature of tan δ can be expressed in terms of a peak top frequency of tan δ by means of the time-temperature reduction law. The peak top frequency of tan δ is corresponding to a frequency at which on the occasion of using the resin composition as a vibration damping material, the damping properties can be highly exhibited.

A relation between the peak top temperature of tan δ at 1 Hz and the peak top frequency of tan δ at 20° C. is as follows.

(Peak top temperature of tan δ at 1 Hz)–(Peak top temperature of tan δ at 20° C.); 20° C.−1 Hz; 12° C.−10 Hz; 3° C.−100 Hz; −7° C.−1,000 Hz; −10° C.−3,000 Hz; −17° C.−10,000 Hz; −26° C.−100,000 Hz; −36° C.−1,000,000 Hz In this way, the peak top frequency of tan δ at 20° C. increases with a decrease of the peak top temperature of tan δ at 1 Hz, and therefore, in order to use the resin composition as a vibration damping material for which vibration damping in an appropriate frequency region (in general, 1 Hz to 100,000 Hz) is demanded, it is preferred to regulate the peak top temperature of tan δ of the resin composition to an appropriate range.

Above all, in the case of using the resin composition of the present invention as an intermediate film for laminated glass, tan δ at −10° C.−3,000 Hz is important. The tan δ of the resin composition at −10° C. is preferably 0.3 or more, more preferably 1.0 or more, still more preferably 1.5 or more, yet still more preferably 2.0 or more, and especially preferably 2.5 or more. When the tan δ of the resin composition at −10° C. falls within the aforementioned range, on the occasion of using the resin composition as an intermediate film for laminated glass, a high-frequency region of 3,000 Hz or more can be effectively subjected to sound insulation, and the sound insulation properties are more improved.

Furthermore, when the tan δ of the component (X) at −10° C. is made as a basis, a difference (Δ tan δ) of the tan δ of the composition at −10° C. therefrom tends to become preferably 0 or more, more preferably +0.1 or more, still more preferably +0.3 or more, and especially preferably +0.5 or more.

The measurement method of the tan δ at −10° C. is one described in the section of Examples.

(Morphology of Resin Composition)

It is preferred that the morphology of a film having a thickness of 1 mm, which is obtained by molding the resin composition of the present invention under a pressurizing condition at a temperature of 200° C. and a pressure of 10 MPa for 3 minutes, has a microphase-separated structure of a sphere or cylinder. The microphase-separated structure of a sphere or cylinder as referred to herein is identical with the microphase-separated structure as illustrated in FIG. 1 or FIG. 2, which the block copolymer or hydrogenation product (X) forms. Although there is no particular limitation, in the resin composition, the polymer block (A) of the component (X) becomes an island phase and tends to form a sphere or cylinder (corresponding to "1" in FIG. 1 and FIG. 2), and the component (Y) is compatibilized with the polymer block (B) of the component (X) and tends to form a sea phase (corresponding to "2" in FIG. 1 and FIG. 2).

In view of the fact that the morphology of the film obtained through molding as mentioned above has a microphase-separated structure of a sphere or cylinder, the damping properties become much higher. From the same viewpoint, it is more preferred that the morphology of the film has a microphase-separated structure of a sphere.

Although the morphology is evaluated after forming the film, it may be considered that the resin composition itself also has the same morphology.

[Use]

The resin composition of the present invention is very excellent in damping properties. For that reason, the present invention also provides a vibration damping material, a sound insulator, an intermediate film for laminated glass, and so on, each containing the resin composition of the present invention. As for the vibration damping material, in particular, the resin composition is suitably used as a vibration damping material for use of automobile. In addition, besides, the present invention is useful for a dam rubber, a shoe sole material, a flooring material, a weather strip, a floor mat, a dash insulator, a roof lining, a door panel, an engine head cover, a door hole seal, a fender liner, and so on.

The resin composition of the present invention can be utilized for a sealing material, an adhesive, a pressure-sensitive adhesive, a packing material, an O-ring, a belt, a soundproof material, and so on in various recorders in the field of household electrical appliance, such as a TV, a Blu-ray recorder and an HDD recorder; and in various electrical products, such as a projector, a game player, a digital camera, a home video recorder, an antenna, a speaker, an electronic dictionary, an IC recorder, a fax machine, a copying machine, a telephone, an intercom, a rice cooker, a microwave oven, a multifunction microwave oven, a refrigerator, a dishwasher, a dish dryer, an IH cooking heater, a hot plate, a vacuum cleaner, a washing machine, a battery charger, a sewing machine, an iron, a drier, a power-assisted bicycle, an air cleaner, a water purifier, an electric toothbrush, lighting equipment, an air conditioner, an outdoor unit of air conditioner, a dehumidifier, and a humidifier.

All of the items mentioned in this specification can be optionally adopted. Namely, not only one item which is indicated to be preferred can be adopted, but also an item which is indicated to be preferred can be adopted in combination with other item which is indicated to be preferred.

EXAMPLES

The present invention is hereunder described in more detail by reference to Examples, but it should be construed that the present invention is by no means limited by these Examples.

Each of measurement methods in each of the Examples was carried out as follows.

[Measurement Method of Physical Properties of Hydrogenated Block Copolymer]

(1) Content of Polymer Block (A)

A hydrogenated block copolymer was dissolved in CDCl$_3$ and subjected to $^1$H-NMR spectrum measurement [apparatus: "ADVANCE 400 Nano bay" (manufactured by Bruker Corporation), measurement temperature: 50° C.], thereby calculating the content of the polymer block (A) from a peak intensity derived from styrene.

(2) Morphology

The hydrogenated block copolymer was pressurized at a temperature of 200° C. and a pressure of 10 MPa for 3 minutes, thereby producing a film having a thickness of 1 mm. The film was cut in a desired size to prepare a test piece, which was then subjected to surface shaping with a diamond cutter at a surface shaping temperature of −110° C. A cross section (1 μm in square) of the test piece was observed with a scanning probe microscope (SPM) (manufactured by SIT Nano Technology Inc.) at a measurement temperature of 25° C., thereby evaluating the morphology. In the case where the test piece has a microphase-separated structure of any one of a sphere (FIG. 1), a cylinder (FIG. 2), and a lamella (FIG. 3), that is indicated in Tables 2 and 3.

(3) Weight Average Molecular Weight (Mw)

A weight average molecular weight (Mw) of the hydrogenated block copolymer as expressed in terms of polystyrene was determined by means of the gel permeation chromatography (GPC) under the following condition. (GPC Measurement Apparatus and Measurement Condition)

Apparatus: GPC apparatus "HLC-8020" (manufactured by Tosoh Corporation)
Separation columns: "TSKgel GMHXL", "G4000HXL", and "G5000HXL", all of which are manufactured by Tosoh Corporation, were connected in series with each other.
Eluent: Tetrahydrofuran
Eluent flow rate: 1.0 mL/min
Sample concentration: 5 mg/10 mL
Column temperature: 40° C.
Detector: Differential refractive index (RI) detector
Calibration curve: Prepared using standard polystyrene (4) Hydrogenation Rate of Polymer Block (B)

A hydrogenation rate of a polymer block (B) of the hydrogenated block copolymer was determined through the $^1$H-NMR measurement.

Apparatus: Nuclear magnetic resonator "ADVANCE 400 Nano Bay" (manufactured by Bruker Corporation)
Solvent: Deuterated chloroform (5) Vinyl Bond Amount of Polymer Block (B) in Hydrogenated Block Copolymer (Total Content of 1,2-Bond and 3,4-Bond)

The block copolymer prior to hydrogenation was subjected to $^1$H-NMR measurement, and a proportion of a peak area of a 1,2-bond and a 3,4-bond relative to a sum total of the peak area of the 1,2-bond and the 3,4-bond, and a peak area of a 1,4-bond was calculated and defined as a vinyl bond amount.

(6) Glass Transition Temperature [Tg(X)] of Polymer Block (B)

Using a differential scanning calorimeter, "DSC6200" (manufactured by Seiko Instruments Inc.), a hydrogenated block copolymer was precisely weighed and subjected to temperature rise from −120° C. to 60° C. at a temperature rise rate of 10° C./min, and a temperature of an inflection point of the measurement curve was read out and defined as a glass transition temperature [Tg(X)] of the polymer block (B).

[Measurement Method of Physical Properties of Tackifier Resin]

(7) Acid Value

An acid value of a tackifier resin was determined by the potentiometric titration method as described in JIS K0700 (1992).

(8) Glass Transition Temperature [Tg(Y)]

Using a differential scanning calorimeter, "DSC6200" (manufactured by Seiko Instruments Inc.), a tackifier resin was precisely weighed and subjected to temperature rise from −120° C. to 100° C. at a temperature rise rate of 10° C./min, and a temperature of an inflection point of the measurement curve was read out and defined as a glass transition temperature [Tg(Y)] of the tackifier resin.

(9) Weigh Average Molecular Weight

A weight average molecular weight of a tackifier resin was determined in the same manner as in the measurement method of weight average molecular weight of the hydrogenated block copolymer.

[Each of Components Used in Examples]

A production method of the hydrogenated block copolymer used in each of the Examples and Comparative Examples is hereunder described.

(Production Example 1) Production of Hydrogenated Block Copolymer (X-1)

After purging with nitrogen, while flowing nitrogen, a dried pressure-resistant container was charged with 50 kg of, as a solvent, cyclohexane and 20 g of a cyclohexane solution of, as an anionic polymerization initiator, sec-butyllithium having a concentration of 10.5% by mass (substantial addition amount of sec-butyllithium: 2.1 g) and further charged with 340 g of, as a Lewis base, tetrahydrofuran.

After subjecting the inside of the pressure-resistant container to temperature rise to 50° C., 0.16 kg of styrene (1) was added and polymerized for 1 hour, 7.8 kg of isoprene was subsequently added and polymerized for 2 hours, and 0.16 kg of styrene (2) was further added and polymerized for 1 hour, thereby obtaining a reaction liquid containing a polystyrene-polyisoprene-polystyrene triblock copolymer.

To the reaction liquid, a Ziegler-based hydrogenation catalyst formed of nickel octylate and trimethylaluminum was added in a hydrogen atmosphere, and reaction was performed under a condition at a hydrogen pressure of 1 MPa and 80° C. for 5 hours. After standing the reaction liquid for cooling and pressure discharge, the aforementioned catalyst was removed by water washing, and the residue was dried in vacuo, thereby obtaining a hydrogenation product of the polystyrene-polyisoprene-polystyrene triblock copolymer (hereinafter sometimes referred to as "X-1").

Each of the raw materials and its use amount are summarized in Table 1. In addition, physical properties of the hydrogenated block copolymer (X-1) are separately shown in Table 2.

(Production Examples 2 to 9) Production of Hydrogenated Block Copolymers

Hydrogenated block copolymers (X-2) to (X-8), and (X'-1) were produced in the same manner as in Production Example 1, except that each of the components and its use amount were changed as described in Table 1.

Physical properties of each of the hydrogenated block copolymers are separately shown in Tables 2 and 3.

TABLE 1

| | | Production Example | | | | | | | | |
|---|---|---|---|---|---|---|---|---|---|---|
| | | 1 | 2 | 3 | 4 | 5 | 6 | 7 | 8 | 9 |
| Hydrogenated block copolymer | | X-1 | X-2 | X-3 | X-4 | X-5 | X-6 | X-7 | X-8 | X'-1 |
| Use amount (kg) | Cyclohexane | 50 | 50 | 50 | 50 | 50 | 50 | 50 | 50 | 50 |
| | sec-Butyllithium (10.5% by mass cyclohexane solution) | 0.020 | 0.054 | 0.020 | 0.076 | 0.111 | 0.076 | 0.130 | 0.130 | 0.030 |
| (A) | Styrene (1) | 0.16 | 0.75 | 0.16 | 0.50 | 1.00 | 1.00 | 1.70 | 1.70 | 2.1 |
| | Styrene (2) | 0.16 | 0.75 | 0.16 | 1.50 | 1.00 | 1.00 | 1.70 | 1.70 | 2.1 |
| (B)[1] | Isoprene | 7.80 | 11.00 | 4.37 | 8.20 | | 6.91 | 13.31 | 13.31 | 8.36 |
| | Butadiene | | | 3.43 | 6.50 | 14.60 | 5.59 | | | |
| | Styrene (3) | | | | | | 2.21 | | | |
| Lewis base | Tetrahydrofuran | 0.34 | 0.28 | 0.31 | 0.31 | | 0.31 | | 0.29 | 0.28 |
| | N,N,N',N'-Tetramethyl ethylenediamine | | | | | 0.030 | | 0.07 | | |

[1] As for the raw material of the polymer block (B), in the case of using plural compounds, a mixture thereof was used.

The tackifier resins used in the Examples and Comparative Examples are as follows. Physical properties of the tackifier resins are shown in Tables 2 and 3.
(Tackifier Resins Used)
Hydrogenated rosin methyl ester
Rosin methyl ester (non-hydrogenated)
Daimaron (manufactured by Yasuhara Chemical Co., Ltd.)
Regalez (registered trademark) 1018 (manufactured by Eastman)
Pinecrystal (registered trademark) KE-311 (manufactured by Arakawa Chemical Industries, Ltd.)
Arkon (registered trademark) P100 (manufactured by Arakawa Chemical Industries, Ltd.)

(Examples 1 to 12 and Comparative Examples 1 to 4) Production of Resin Composition The hydrogenated block copolymer obtained in each of the Production Examples and the tackifier resin shown in Table 2 or 3 were dissolved in toluene and mixed, and subsequently, the toluene was volatilized to prepare a resin composition. Using the resulting resin composition, the respective physical properties evaluations were performed according to measurement methods as mentioned later. The results are shown in Tables 2 and 3.

The physical properties evaluations of the resin composition obtained in each of the Examples were carried out in the following manners.
[Evaluation Methods of Physical Properties of Resin Composition]
(10) Morphology of Resin Composition
The resin composition was pressurized at a temperature of 200° C. and a pressure of 10 MPa for 3 minutes, thereby producing a film having a thickness of 1 mm. Using the film, its morphology was evaluated in the same measurement method of morphology of the hydrogenated block copolymer. In the case where the test piece has a microphase-separated structure of any one of a sphere (FIG. 1), a cylinder (FIG. 2), and a lamella (FIG. 3), that is indicated in Tables 2 and 3.
(11) Measurement of tan δ
For the following measurement, on the occasion of vaporizing the toluene, the thickness was regulated to 1.0 mm, thereby producing a single-layer sheet having a thickness of 1.0 mm. The single-layer sheet is cut out in a disk shape, to prepare a test piece.
For the measurement, a strain-controlled dynamic viscoelasticity apparatus having a diameter of disk of 8 mm, "ARES-G2" (manufactured by TA Instruments Japan Inc.) was used as a parallel-plate oscillatory rheometer on a basis of JIS K7244-10 (2005).

A gap between two disks was completely filled with the aforementioned test sheet, an oscillation was given to the test sheet at a strain amount of 0.1% and a frequency of 1 Hz, and the temperature was raised from −70° C. to 200° C. at a constant rate of 3° C./min. The temperature of each of the aforementioned test sheet and the disk was kept until the measured values of shear loss modulus and shear storage modulus did not change, thereby determining a tan δ of the resin composition at −10° C. and a maximum value of peak intensity of tan δ (peak top intensity). It is indicated that the larger the value, the more excellent the damping properties.
(12) Δ tan δ
The measurement was performed in the same manner as in the measurement of tan δ in the above (11), except for using a hydrogenated block copolymer in place of the resin composition.

By making the peak top intensity of tan δ when using the hydrogenated block copolymer as a basis, a rise width of the peak top intensity of tan δ when using the resin composition was determined, and the foregoing value was defined as a difference (Δ tan δ) of peak top intensity.

By making a tan δ at −10° C. when using the hydrogenated block copolymer as a basis, a rise width of tan δ when using the resin composition was determined, and the foregoing value was defined as a difference (Δ tan δ) at −10° C.

The case where the tan δ when using the resin composition was larger is expressed as plus (+), whereas the case where the tan δ when using the resin composition was smaller is expressed as minus (−). It is indicated that the larger the value, the more excellent the effect for improving the damping properties.
(13) Ratio of Storage Modulus G' (−5) at ((Peak Top Temperature of tan δ)−5° C.) of Resin Composition to Storage Modulus G' (Top) at Peak Top Temperature [G' (−5)/G' (Top)]

The resin composition was pressurized at a temperature of 200° C. and a pressure of 10 MPa for 3 minutes to produce a single-layer sheet having a thickness of 1.0 mm, and the single-layer sheet was cut out in a disk shape, to prepare a test piece. Using the film, its storage modulus was measured under a condition at a strain amount of 0.1%, a frequency of 1 Hz, a measurement temperature of −70 to 200° C., and a temperature rise rate of 3° C./min in conformity with JIS K7244-10 (2005).

From the storage modulus G' (top) at the temperature (peak top temperature of tan δ) at which the peak top intensity of tan δ was obtained in the above (11) and the storage modulus G' (−5) at the ((peak top temperature of tan δ)−5° C.), a ratio thereof [G' (−5)/G' (top)] was calculated.

TABLE 2

|  |  | Example |  |  |  |  |  |
|---|---|---|---|---|---|---|---|
|  |  | 1 | 2 | 3 | 4 | 5 | 6 |
| Component (X) | Hydrogenated block copolymer used | X-1 | X-2 | X-3 | X-4 | X-5 | X-6 |
|  | Component constituting polymer block (A) | St | St | St | St | St | St |
|  | Component constituting polymer block (B) *1 | Ip | Ip | Ip/Bd | Ip/Bd | Bd | Ip/Bd/St |
|  | Mass ratio of component constituting polymer block (B) | 100 | 100 | 56/44 | 56/44 | 100 | 47/38/15 |
|  | Molar ratio of component constituting polymer block (B) | 100 | 100 | 50/50 | 50/50 | 100 | 45/45/10 |
|  | Polymer structure | A/B/A | A/B/A | A/B/A | A/B/A | A/B/A | A/B/A |
|  | Content of polymer block (A) (mass %) | 4 | 12 | 4 | 12 | 12 | 12 |
|  | Hydrogenation rate of polymer block (B) (mol %) | 92 | 91 | 96 | 90 | 94 | 90 |
|  | Vinyl bond amount of polymer block (B) (mol %) | 63 | 58 | 61 | 64 | 75 | 59 |
|  | Morphology of hydrogenated block copolymer | Sphere | Sphere | Sphere | Sphere | Sphere | Sphere |
|  | Weight average molecular weight of hydrogenated block copolymer | 404,000 | 182,000 | 373,000 | 165,000 | 150,000 | 225,000 |
|  | Tg(X) (° C.) | −11 | −17 | −36 | −27 | −43 | −22 |
| Component (Y) | Tackifier resin used | Hydrogenated rosin methyl ester | Hydrogenated rosin methyl ester | Hydrogenated rosin methyl ester | Hydrogenated rosin methyl ester | Hydrogenated rosin methyl ester | Hydrogenated rosin methyl ester |
|  | Acid value (mgKOH/g) | <1 | <1 | <1 | <1 | <1 | <1 |
|  | Presence or absence of oxygen atom | Yes | Yes | Yes | Yes | Yes | Yes |
|  | Whether or not rosin ester is | Yes | Yes | Yes | Yes | Yes | Yes |
|  | Tg(Y) (° C.) | −29 | −29 | −29 | −29 | −29 | −29 |
|  | State at 25° C. | Liquid | Liquid | Liquid | Liquid | Liquid | Liquid |
|  | Weight average molecular weight | 320 | 320 | 320 | 320 | 320 | 320 |
|  | \|ΔTg\| *2 | 18 | 12 | 7 | 2 | 14 | 7 |
| Resin composition | G' (−5)/G' (top) | 18.9 | 15.8 | 16.5 | 13.3 | 14.7 | 14.7 |
|  | Hydrogenated block copolymer/tackifier resin (mass ratio) | 60/40 | 60/40 | 60/40 | 60/40 | 60/40 | 60/40 |
|  | Morphology of resin composition | Sphere | Sphere | Sphere | Sphere | Sphere | Sphere |
|  | Peak top temperature of tanδ | −11 | −14 | −24 | −22 | −32 | −18 |
|  | Peak top intensity of tanδ | 3.9 | 3.6 | 3.1 | 3.3 | 3.2 | 3.1 |
|  | Difference in peak top intensity (Δtanδ) | +1.3 | +1.1 | +1.0 | +1.1 | +1.1 | +1.0 |
|  | tanδ at −10° C. | 3.9 | 2.8 | 0.7 | 0.9 | 0.4 | 1.5 |
|  | Difference in tanδ at −10° C. (Δtanδ) | +3.2 | +0.4 | 0 | 0 | +0.1 | −0.2 |

|  |  | Example |  |  |  |  |  |
|---|---|---|---|---|---|---|---|
|  |  | 7 | 8 | 9 | 10 | 11 | 12 |
| Component (X) | Hydrogenated block copolymer used | X-4 | X-7 | X-4 | X-4 | X-4 | X-4 |
|  | Component constituting polymer block (A) | St | St | St | St | St | St |
|  | Component constituting polymer block (B) *1 | Ip/Bd | Ip | Ip/Bd | Ip/Bd | Ip/Bd | Ip/Bd |
|  | Mass ratio of component constituting polymer block (B) | 56/44 | 100 | 56/44 | 56/44 | 56/44 | 56/44 |
|  | Molar ratio of component constituting polymer block (B) | 50/50 | 100 | 50/50 | 50/50 | 50/50 | 50/50 |
|  | Polymer structure | A/B/A | A/B/A | A/B/A | A/B/A | A/B/A | A/B/A |
|  | Content of polymer block (A) (mass %) | 12 | 20 | 12 | 12 | 12 | 12 |
|  | Hydrogenation rate of polymer block (B) (mol %) | 90 | 86 | 90 | 90 | 90 | 90 |
|  | Vinyl bond amount of polymer block (B) (mol %) | 64 | 73 | 64 | 64 | 64 | 64 |
|  | Morphology of hydrogenated block copolymer | Sphere | Cylinder | Sphere | Sphere | Sphere | Sphere |
|  | Weight average molecular weight of hydrogenated block copolymer | 165,000 | 130,000 | 165,000 | 165,000 | 165,000 | 165,000 |
|  | Tg(X) (° C.) | −27 | 17 | −27 | −27 | −27 | −27 |
| Component (Y) | Tackifier resin used | Rosin methyl ester | Hydrogenated rosin methyl ester | Daimaron | Hydrogenated rosin methyl ester | Hydrogenated rosin methyl ester | Regalez 1018 |
|  | Acid value (mgKOH/g) | <1 | <1 | — | <1 | <1 | — |
|  | Presence or absence of oxygen atom | Yes | Yes | No | Yes | Yes | No |
|  | Whether or not rosin ester is | Yes | Yes | No | Yes | Yes | No |
|  | Tg(Y) (° C.) | −25 | −29 | −20 | −29 | −29 | −23 |
|  | State at 25° C. | Liquid | Liquid | Liquid | Liquid | Liquid | Liquid |

TABLE 2-continued

|  |  |  |  |  |  |  |  |
|---|---|---|---|---|---|---|---|
| | Weight average molecular weight | 318 | 320 | 480 | 320 | 320 | 300 |
| | \|ΔTg\| *2 | 2 | 46 | 7 | 2 | 2 | 4 |
| Resin composition | G' (−5)/G' (top) | 17.5 | 6.1 | 8.4 | 20.9 | 12.9 | 7.6 |
| | Hydrogenated block copolymer/tackifier resin (mass ratio) | 60/40 | 60/40 | 60/40 | 50/50 | 80/20 | 60/40 |
| | Morphology of resin composition | Sphere | Cylinder | Sphere | Sphere | Sphere | Sphere |
| | Peak top temperature of tanδ | −21 | 5 | −18 | −22 | −21 | −9 |
| | Peak top intensity of tanδ | 3.2 | 2.1 | 2.8 | 3.7 | 2.7 | 2.8 |
| | Difference in peak top intensity (Δtanδ) | +1.0 | +0.5 | +0.6 | +1.5 | +0.5 | +0.6 |
| | tanδ at −10° C. | 1.0 | 0.3 | 1.6 | 1.0 | 0.9 | 2.6 |
| | Difference in tanδ at −10° C. (Δtanδ) | +0.1 | +0.2 | +0.7 | +0.1 | 0 | +1.7 |

*1 St = Styrene, Ip = Isoprene, Bd = Butadiene,
*2 Absolute value of difference between Tg(X) and Tg(Y)

TABLE 3

| | | Comparative Example | | | |
|---|---|---|---|---|---|
| | | 1 | 2 | 3 | 4 |
| Component (X) | Hydrogenated block copolymer used | X-4 | X-4 | X-8 | X'-1 |
| | Component constituting polymer block (A) | St | St | St | St |
| | Component constituting polymer block (B)*1 | Ip/Bd | Ip/Bd | Ip | Ip |
| | Mass ratio of component constituting polymer block (B) | 56/44 | 56/44 | 100 | 100 |
| | Molar ratio of component constituting polymer block (B) | 50/50 | 50/50 | 100 | 100 |
| | Polymer structure | A/B/A | A/B/A | A/B/A | A/B/A |
| | Content of polymer block (A) (mass %) | 12 | 12 | 20 | 33 |
| | Hydrogenation rate of polymer block (B) (mol %) | 90 | 90 | 89 | 90 |
| | Vinyl bond amount of polymer block (B) (mol %) | 64 | 64 | 61 | 60 |
| | Morphology of hydrogenated block copolymer | Sphere | Sphere | Cylinder | Cylinder |
| | Weight average molecular weight of hydrogenated block copolymer | 165,000 | 165,000 | 107,000 | 310,000 |
| | Tg (X) (° C.) | −27 | −27 | −13 | −13 |
| Component (Y) | Tackifier resin used | Pinecrystal KE-311 | Arkon P100 | Arkon P100 | Hydrogenated rosin methyl ester |
| | Acid value (mgKOH/g) | 2 to 10 | — | — | <1 |
| | Presence or absence of oxygen atom | Yes | No | No | Yes |
| | Whether or not rosin ester is | Yes | No | No | Yes |
| | Tg (Y) (° C.) | 58 | 48 | 48 | −29 |
| | State at 25° C. | Solid | Solid | Solid | Liquid |
| | Weight average molecular weight | 820 | 1,390 | 1,390 | 320 |
| | \|ΔTg\|*2 | 85 | 75 | 61 | 16 |
| Resin composition | G' (−5)/G' (top) | 3.3 | 3.3 | 3.9 | 2.7 |
| | Hydrogenated block copolymer/tackifier resin (mass ratio) | 60/40 | 60/40 | 60/40 | 60/40 |
| | Morphology of resin composition | Sphere | Sphere | Cylinder | Cylinder |
| | Peak top temperature of tanδ | −2 | 10 | 15 | −14 |
| | Peak top intensity of tanδ | 1.3 | 1.8 | 1.5 | 0.7 |
| | Difference in peak top intensity (Δtanδ) | −0.9 | −0.4 | −0.7 | 0.0 |
| | tanδ at −10° C. | 0.9 | 0.3 | 0.1 | 0.6 |
| | Difference in tanδ at −10° C. (Δtanδ) | 0 | 0.3 | −0.7 | −0.4 |

*1St = Styrene, Ip = Isoprene, Bd = Butadiene,
*2Absolute value of difference between Tg (X) and Tg (Y)

From Tables 2 and 3, it is noted that In Examples 1 to 12, the peak top intensity of tan δ was not only high but also significantly improved relative to the peak top intensity of tan δ when using only the component (X). In addition, in view of the fact that the tan δ of the resin composition at −10° C. is high, it may be said that on the occasion of using the resin composition of the present invention for an intermediate film for laminated glass, a high-frequency region of 3,000 Hz or more can be effectively subjected to sound insulation.

On the other hand, in the case of Comparative Examples 1 to 3 in which the |ΔTg| is higher than 50° C., not only the peak top intensity of tan δ of the resin composition was insufficient, but also the improving effect relative to the peak top intensity of tan δ when using only the component (X) was not perceived, but a tendency of lowering of the foregoing effect was rather perceived. In addition, in Comparative Example 4 using the hydrogenated block copolymer (X'-1) having the content of the polymer block (A) of more than 25% by mass, nevertheless the |ΔTg| is 50° C. or lower, not only the peak top intensity of tan δ of the resin composition was insufficient, but also the improving effect relative to the peak top intensity of tan δ when using only the hydrogenated block copolymer was not perceived. Namely, it may be said that the effects of the invention of this application are an effect that is revealed in the case where the content of the polymer block (A) is 25% by mass or less.

INDUSTRIAL APPLICABILITY

The resin composition of the present invention is very excellent in damping properties. For that reason, a vibration damping material, a sound insulator, an intermediate film for laminated glass, and so on, each containing the resin composition of the present invention, are also industrially useful. In addition, besides, a dam rubber, a shoe sole material, a flooring material, a weather strip, a floor mat, a dash insulator, a roof lining, a door panel, an engine head cover, a door hole seal, a fender liner, and so on, each containing the resin composition of the present invention, are also industrially useful.

In addition, the resin composition of the present invention can be utilized for a sealing material, an adhesive, a pressure-sensitive adhesive, a packing material, an O-ring, a belt, a soundproof material, and so on in various recorders in the field of household electrical appliance, such as a TV, a Blu-ray recorder and an HDD recorder; and in various electrical products, such as a projector, a game player, a digital camera, a home video recorder, an antenna, a speaker, an electronic dictionary, an IC recorder, a fax machine, a copying machine, a telephone, an intercom, a rice cooker, a microwave oven, a multifunction microwave oven, a refrigerator, a dishwasher, a dish dryer, an IH cooking heater, a hot plate, a vacuum cleaner, a washing machine, a battery charger, a sewing machine, an iron, a drier, a power-assisted bicycle, an air cleaner, a water purifier, an electric toothbrush, lighting equipment, an air conditioner, an outdoor unit of air conditioner, a dehumidifier, and a humidifier.

REFERENCE SIGNS LIST

1: Polymer block (A)
2: Polymer block (B), or polymer block (B) and component (Y)
3: Storage modulus G' (top) at peak top temperature of tan δ of resin composition
4: Storage modulus G' (−5) at ((the aforementioned peak top temperature)−5° C.)
5: Gradient expressed by [G' (−5)/G' (top)]

The invention claimed is:

1. A resin composition comprising a block copolymer or hydrogenation product thereof (X); and a tackifier resin (Y) having a glass transition temperature of −50 to 45° C.,
   wherein, when a glass transition temperature of a polymer block (B) of the block copolymer or hydrogenation product thereof (X) is designated as Tg(X), and a glass transition temperature of the tackifier resin (Y) is designated as Tg(Y), an absolute value of a difference between Tg(X) and Tg(Y) is 50° C. or lower,
   wherein the block copolymer or hydrogenation product thereof (X) is: a block copolymer or a hydrogenation product thereof having a polymer block (A) comprising more than 70 mol % of a structural unit derived from an aromatic vinyl compound and a polymer block (B) comprising 30 mol % or more of a structural unit derived from at least one selected from the group consisting of a conjugated diene compound and isobutylene, wherein the content of the polymer block (A) in the block copolymer is 25% by mass or less.

2. The resin composition according to claim 1, wherein a molecular weight of the tackifier resin (Y) is from 100 to 10,000.

3. The resin composition according to claim 1, wherein the tackifier resin (Y) has an alicyclic skeleton.

4. The resin composition a according to claim 1, wherein the tackifier resin (Y) comprises an oxygen atom.

5. The resin composition according to claim 1, wherein an acid value of the tackifier resin (Y) is 100 mgKOH/g or less.

6. The resin composition according to claim 1, wherein the tackifier resin (Y) is at least one selected from the group consisting of a rosin-based resin, a phenol-based resin, and a coumarone-indene-based resin.

7. The resin composition according to claim 6, wherein the rosin-based resin is a hydrogenated or non-hydrogenated rosin ester.

8. The resin composition according to claim 1, wherein the tackifier resin (Y) is liquid at 25° C.

9. The resin composition according to claim 1, wherein a weight average molecular weight of the block copolymer or hydrogenation product thereof (X) is from 20,000 to 800,000.

10. The resin composition according to claim 1, wherein in the hydrogenation product, a hydrogenation rate of the polymer block (B) is from 80 to 99 mol %.

11. The resin composition according to claim 1, wherein in the block copolymer or hydrogenation product thereof (X), the conjugated diene compound is isoprene, butadiene, or a mixture of isoprene and butadiene.

12. The resin composition according to claim 1, wherein the content of the polymer block (A) in the block copolymer is from 1 to 15% by mass.

13. The resin composition according to claim 1, wherein a content proportion of the component (X) and the component (Y) [X/Y] is from 90/10 to 10/90 in terms of a mass ratio.

14. The resin composition according to claim 1, wherein a morphology of a film having a thickness of 1 mm, which is obtained by molding the block copolymer or hydrogenation product thereof (X) according to the following molding condition, has a microphase-separated structure of a sphere:
   Molding condition: to apply a pressure at a temperature of 200° C. under a pressure of 10 MPa for 3 minutes.

15. The resin composition according to claim 1, wherein a morphology of a film having a thickness of 1 mm, which is obtained by molding the resin composition according to the following molding condition, has a microphase-separated structure of a sphere:
   Molding condition: to apply a pressure at a temperature of 200° C. under a pressure of 10 MPa for 3 minutes.

16. The resin composition according to claim 1, wherein a ratio of a storage modulus G' (−5) at ((peak top temperature of tan δ)−5° C.) of the resin composition to a storage modulus G' (top) at the peak top temperature [G' (−5)/G' (top)] is 10 or more.

17. The resin composition according to claim 1, wherein a peak intensity of tan δ, which is measured under a condition at a strain amount of 0.1%, a frequency of 1 Hz, a measurement temperature of −70 to 200° C., and a temperature rise rate of 3° C./min in conformity with JIS K7244-10 (2005), is 2.5 or more.

18. A pellet or a veil comprising the resin composition according to claim 1.

19. A vibration damping material, a sound insulator or an intermediate film, comprising the resin composition according to claim 1.

* * * * *